Aug. 21, 1945.　　　S. G. DOWN　　　2,383,241
BRAKE CYLINDER
Filed April 6, 1943　　　2 Sheets-Sheet 2
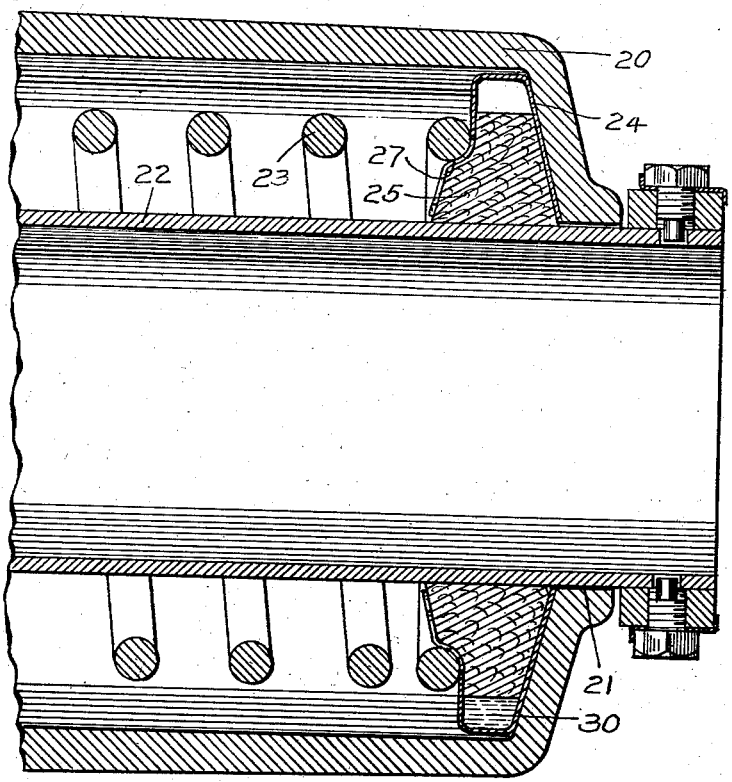
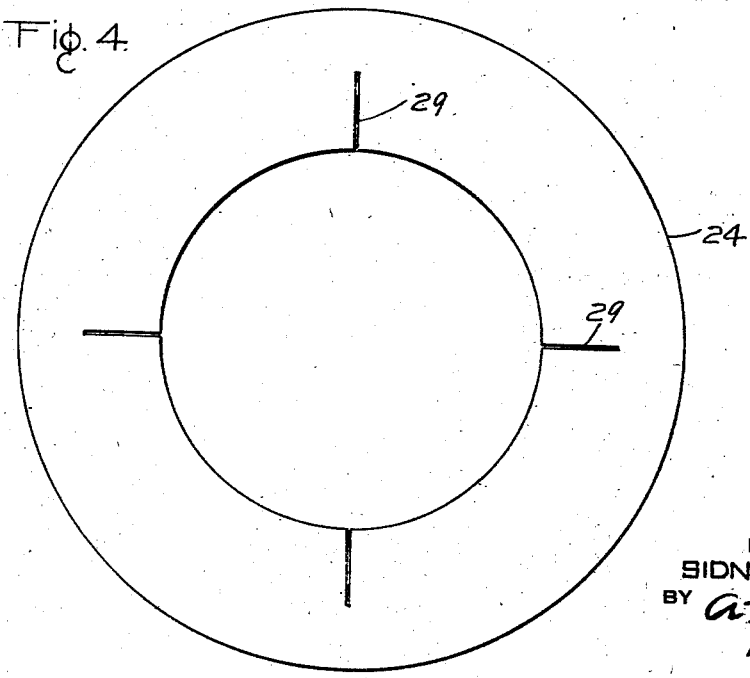
INVENTOR
SIDNEY G. DOWN
BY
ATTORNEY Patented Aug. 21, 1945

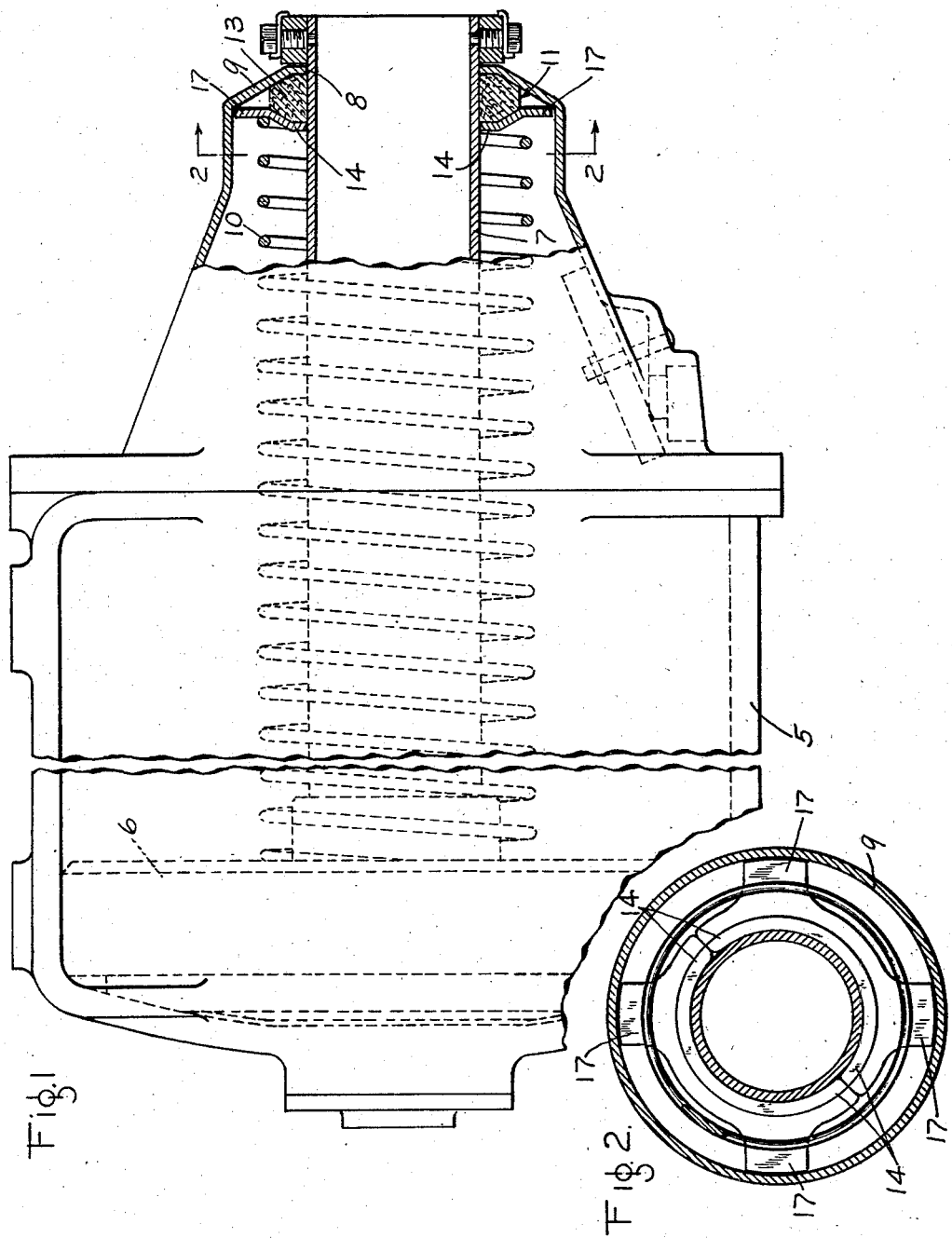

2,383,241

UNITED STATES PATENT OFFICE 2,383,241

BRAKE CYLINDER

Sidney G. Down, Edgewood, Pa., assignor to The Westinghouse Air Brake Company, Wilmerding, Pa., a corporation of Pennsylvania Application April 6, 1943, Serial No. 481,995

3 Claims. (Cl. 286—30)

This invention relates to brake cylinders for air brake equipments, and more particularly to packing means for the piston rod in a brake cylinder.

The brake cylinders in modern railway brake equipments are customarily mounted either on the vehicle trucks or on the vehicle bodies close to the road bed, and consequently must be provided with means for protecting the operating parts from the dust always encountered under service conditions. It has also been found desirable to equip such brake cylinders with means for lubricating the usual tubular piston rod to minimize the scoring of the surface thereof while in contact with the non-pressure head of the brake cylinder.

One acceptable form of brake cylinder packing recently designed for commercial use comprises an annular packing element made of felt or other fibrous material, and means for subjecting the annular element to the full pressure exerted by the piston return spring for wedging the element into sealing engagement with the associated tubular piston rod. While it is desirable to provide resilient means for forcibly urging a packing of this type constantly into sealing engagement with the piston rod, the uncontrolled force of the heavy piston return spring in a brake cylinder, when applied to such a packing for a long period of time, is apt to effect excessive compacting of the fibers and otherwise to cause damage to the packing tending to shorten its useful period of service.

It is a principal object of my invention to provide an improved brake cylinder packing of the type just described, which includes, in addition to the annular felt sealing element, suitable means cooperative with the piston return spring for imparting a component of the spring force against the felt element for wedging it against the piston rod, while preventing the rest of the spring force from distorting or impairing the usefulness of the fibrous material.

Other objects and advantages of the invention will appear in the following more detailed description thereof, taken in connection with the accompanying drawings, in which Fig. 1 is an elevational sectional view of a brake cylinder embodying a packing constructed in accordance with one form of my invention;

Fig. 2 is a sectional view taken substantially along the line 2—2 of Fig. 1;

Fig. 3 is a fragmentary sectional view of a portion of a brake cylinder assembly embodying a packing device constructed in accordance with a different form of the invention; and Fig. 4 is a face view of one of the elements of the packing device shown in Fig. 3.

Embodiment in Figure 1

Illustrated in Fig. 1 is a brake cylinder 5 having operatively mounted therein a piston 6 to which is secured a hollow piston rod 7, the outer end of which extends through an opening 8 formed in a non-pressure head 9. A coil return spring 10 is provided for biasing the piston 6 toward brake release position, one end of the spring being mounted in engagement with the piston and the other end being adapted to seat on a brake cylinder packing assembly 11 disposed within the non-pressure head 9.

According to the invention, the piston rod packing assembly 11 comprises an annular filter and lubricator member 13, which may be made of felt or other fibrous material, and a plurality of separate spring seat members 14, which are substantially arcuate in form and are assembled in end-to-end relationship between the adjacent end of the coil spring 10 and the annular member 13. The inner surface of the fibrous packing member 13 is adapted to be maintained in sliding engagement with the hollow piston rod 7, and may be suitably treated with lubricant if desired.

As shown in Fig. 1, the fibrous packing member 13 of the assembly is constantly wedged toward the hollow piston rod 7 by reason of the fact that the outer portion of the annular packing element is interposed between oppositely slanting surfaces of the non-pressure head 9 and of the several spring seat members 14, against which the coil spring 10 exerts a thrust.

Each of the spring seat members 14 has formed on the arcuate body thereof an outwardly extending foot portion 17, which is engageable with the end wall of the non-pressure head 9. It will be observed that the medial portion of each seat member 14 is canted, to provide a wedging surface cooperable with the fibrous element 13, and also to provide a suitable off-set surface adapted to fit into the end of the coil spring 10 when the parts are assembled. With the elements assembled as shown in Fig. 1, the spring seat members 14 are adapted to divide the total thrust of the release spring 10, one component of the force being directed harmlessly against the non-pressure head 9, while another component is applied to the fibrous packing member 13. Excessive crushing or distortion of the soft packing member 13 is thus avoided, although the wedging force exerted thereon by the release spring 10 is sufficient to maintain the desired sealing contact of the packing member with the hollow piston rod 7.

Embodiment in Figure 3

In Fig. 3 is illustrated a portion of a brake cylinder assembly, which may be generally similar to the brake cylinder 5 shown in Fig. 1, and which includes a non-pressure head 20 having an opening 21 through which extends the usual tubular piston rod 22. It will be understood that the piston rod 22 is connected to a piston, not shown in Fig. 3, the piston being urged toward normal or release position by the force exerted by a coil spring 23 encircling the piston rod.

The piston rod packing assembly embodying the form of the invention disclosed in Fig. 3 includes an annular channel or jacket member 24, preferably made of metal such as spring steel, and interposed between the end wall of the non-pressure head 20 and the piston return spring 23, and an annular filtering and lubricating element 25, which is made of soft fibrous material such as felt, and which has an inner surface adapted to fit snugly about the piston rod 22.

The annular jacket member 24 is substantially U-shaped in cross section, and constructed and arranged to have sufficient rigidity to withstand the force exerted by the release spring 23 when the several elements are assembled as shown in Fig. 3. An annular depression 27 is formed on the inner skirt of the jacket member 24, the depression having a diameter approximately equaling that of the coil spring 23. Both skirts of the jacket member are inclined, as shown in Fig. 3, so that the fibrous element 25 confined between the skirt portions is subjected to a wedging force tending to maintain contact between that element and the hollow piston rod 22, resulting from limited flexure of the spring steel jacket member under the thrust of the spring 23. As is best shown in Fig. 4 of the drawings, a plurality of radially disposed slots 29 are preferably formed in the skirt of the annular jacket member 24 against which the spring 23 is adapted to seat, to permit the limited flexing just described. These slots terminate outwardly of the annular depression 27 so that the lowermost portion of the jacket member may serve to contain a quantity of lubricant, indicated by the reference character 30 in Fig. 3. The annular fibrous element 25 is thereby maintained in a condition to provide sufficient lubrication of the hollow piston rod 22 over a relatively long period of time.

It will thus be understood that the annular jacket member 24, in combination with the felt or fibrous packing element 25 mounted therein, will serve to support the adjacent end of the coil release spring 23 in proper alignment with respect to the other elements of the brake cylinder assembly, and that with the jacket member so constructed as to permit slight yielding of the skirt thereof containing the radial slots herein- before described, the component forces exerted by the coil spring 23 will be distributed partly through the medium of the fibrous packing element 25 to cause limited thrust thereof against the hollow piston rod 22, and partly through the medium of the substantially rigid body portion of the jacket member bearing against the end wall of the non-pressure head 20.

Having now described my invention, what I claim as new and desire to secure by Letters Patent, is:

1. In a brake cylinder having a non-pressure head, a piston rod extending through an opening therein, and a piston return spring coiled coaxially about said rod, the combination therewith of a piston rod packing assembly comprising an annular channel member interposed between said spring and an end wall of said non-pressure head and encircling said piston rod, and an annular fibrous packing element mounted within said channel element and having an inner surface disposed in sealing engagement with said piston rod, said channel member having a skirt portion which is yieldable so as to transmit a component of the total force exerted by said spring to said fibrous packing element for urging same against the piston rod.

2. In a brake cylinder having a non-pressure head, a piston rod extending through an opening therein, and a piston return spring coiled about said rod, in combination, an annular channel element formed of substantially rigid material and adapted to be interposed between said spring and said non-pressure head, said channel element having one wall thereof formed with an annular recess for receiving the end of said spring and a plurality of radial slots for rendering a portion of said wall relatively yieldable, and an annular packing member formed of fibrous material clamped within said channel element, said fibrous packing member being subject to the wedging action of said flexible wall of the channel element resulting from the thrust of said spring.

3. In a brake cylinder having a non-pressure head, a piston rod extending through an opening therein, and a piston return spring coiled coaxially about said rod, the combination therewith of a piston rod packing assemblage interposed between said spring and said non-pressure head and comprising an annular jacket member substantially U-shaped in cross section and having one skirt portion for engaging the non-pressure head and another skirt portion which is indented for seating said spring, said other skirt portion being slightly yieldable to the pressure of said spring, and an annular packing member formed of lubricant absorbing material mounted between the skirt portions of said jacket member, said packing member being of smaller diameter than said jacket member to thereby provide within the jacket member an annular chamber surrounding said packing member for containing a quantity of lubricant for said packing member.

SIDNEY G. DOWN.